United States Patent [19]

Galloway et al.

[11] Patent Number: 4,785,532
[45] Date of Patent: Nov. 22, 1988

[54] METHOD OF MAKING ELECTRICAL CONNECTOR ASSEMBLY FOR ANTISKID BRAKING SYSTEM

[75] Inventors: Michael D. Galloway, Middletown; William H. Rose; David T. Shaffer, both of Harrisburg, all of Pa.

[73] Assignee: AMP Incorporated, Harrisburg, Pa.

[21] Appl. No.: 67,900

[22] Filed: Jun. 29, 1987

Related U.S. Application Data

[62] Division of Ser. No. 789,999, Oct. 22, 1985, Pat. No. 4,697,863.

[51] Int. Cl.$^4$ .................. H01R 43/16; H01R 43/24
[52] U.S. Cl. .................. 29/827; 29/835; 29/841; 29/847; 29/883; 264/272.11; 264/294
[58] Field of Search ............... 29/827, 835, 841, 847, 29/855, 856, 883; 264/251, 272.11, 294

[56] References Cited

U.S. PATENT DOCUMENTS

| | | | |
|---|---|---|---|
| 3,772,571 | 11/1973 | Merry et al. | 339/126 R |
| 3,798,763 | 3/1974 | Deltoer | 29/883 X |
| 4,047,242 | 9/1977 | Jakob et al. | 339/147 P |
| 4,090,293 | 5/1978 | vander Donk et al. | 339/218 R |
| 4,166,265 | 8/1979 | Reynolds et al. | 336/192 |
| 4,303,297 | 12/1981 | Smart et al. | 339/218 M |
| 4,389,021 | 6/1983 | Coldren | 339/126 R |
| 4,445,736 | 5/1984 | Hopkins | 29/883 X |
| 4,490,004 | 12/1984 | Lawrence et al. | 339/95 R |
| 4,592,611 | 6/1986 | Nitschke | 339/126 R |
| 4,673,837 | 6/1987 | Gingerich et al. | 310/239 |

FOREIGN PATENT DOCUMENTS

| | | | |
|---|---|---|---|
| 2703851 | 1/1978 | Fed. Rep. of Germany | 303/24 A |
| 0737274 | 5/1980 | U.S.S.R. | 303/20 |

OTHER PUBLICATIONS

AMP Handbook HB 5483, "AMP Mag-Mate Interconnect System", AMP Incorporated, Sep. 1980.

Primary Examiner—P. W. Echols
Assistant Examiner—Taylor J. Ross
Attorney, Agent, or Firm—Anton P. Ness

[57] ABSTRACT

A connector assembly for an anti-skid hydraulic braking system comprises a bulkhead connector extending through an aperture in a sidewall of the brake fluid reservoir, a connector harness mounted along the inside of the reservoir sidewalls extending from the bulkhead connector to three solenoid assemblies mounted on the reservoir floor, and a solenoid connector one each solenoid assembly in engagement with the connector harness. The solenoids extend through floor apertures into the master cylinder to respective hydraulic lines extending to brake cylinders in the wheels, one of the solenoids handling both rear wheels. The bulkhead connector mates with a connector outside the reservoir which is terminated to a wire harness connected to the on-board microprocessor to relay current to the solenoids when data from individual wheel speed sensors is processed to determine that a particular wheel is about to skid. The solenoid for that wheel is then instantaneously actuated to momentarily decrease hydraulic pressure in that wheel's brake fluid line. The connector harness is planar and can be bent around corners between adjoining sidewalls of the reservoir. Contact sections on path members of the harness are exposed to be engaged by spring arm contact sections of the bulkhead connector and the individual solenoid connectors. The harness is made by overmolding spaced cover portions over a stamped lead frame and then severing the individual path members from each other, and the path members can be bent between the cover portions.

5 Claims, 16 Drawing Sheets

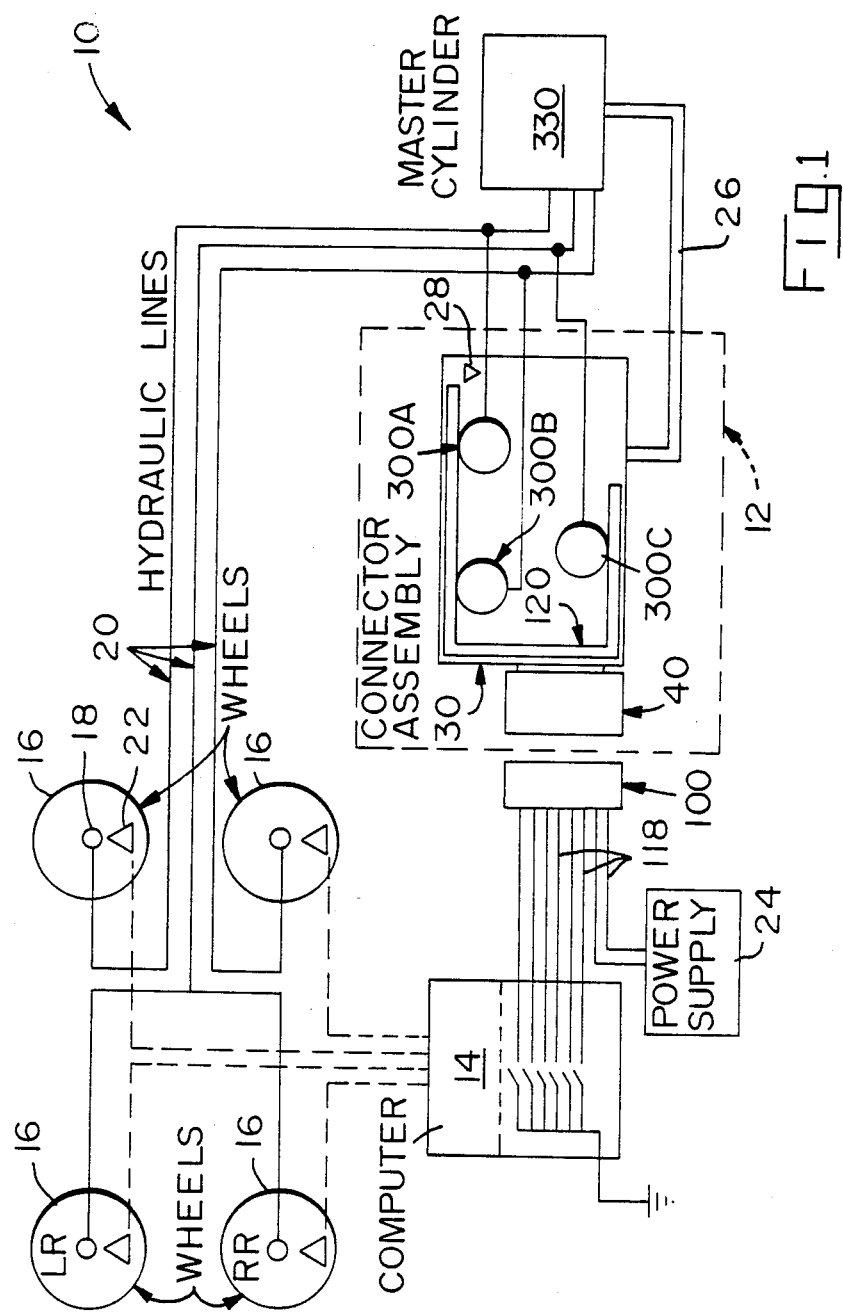

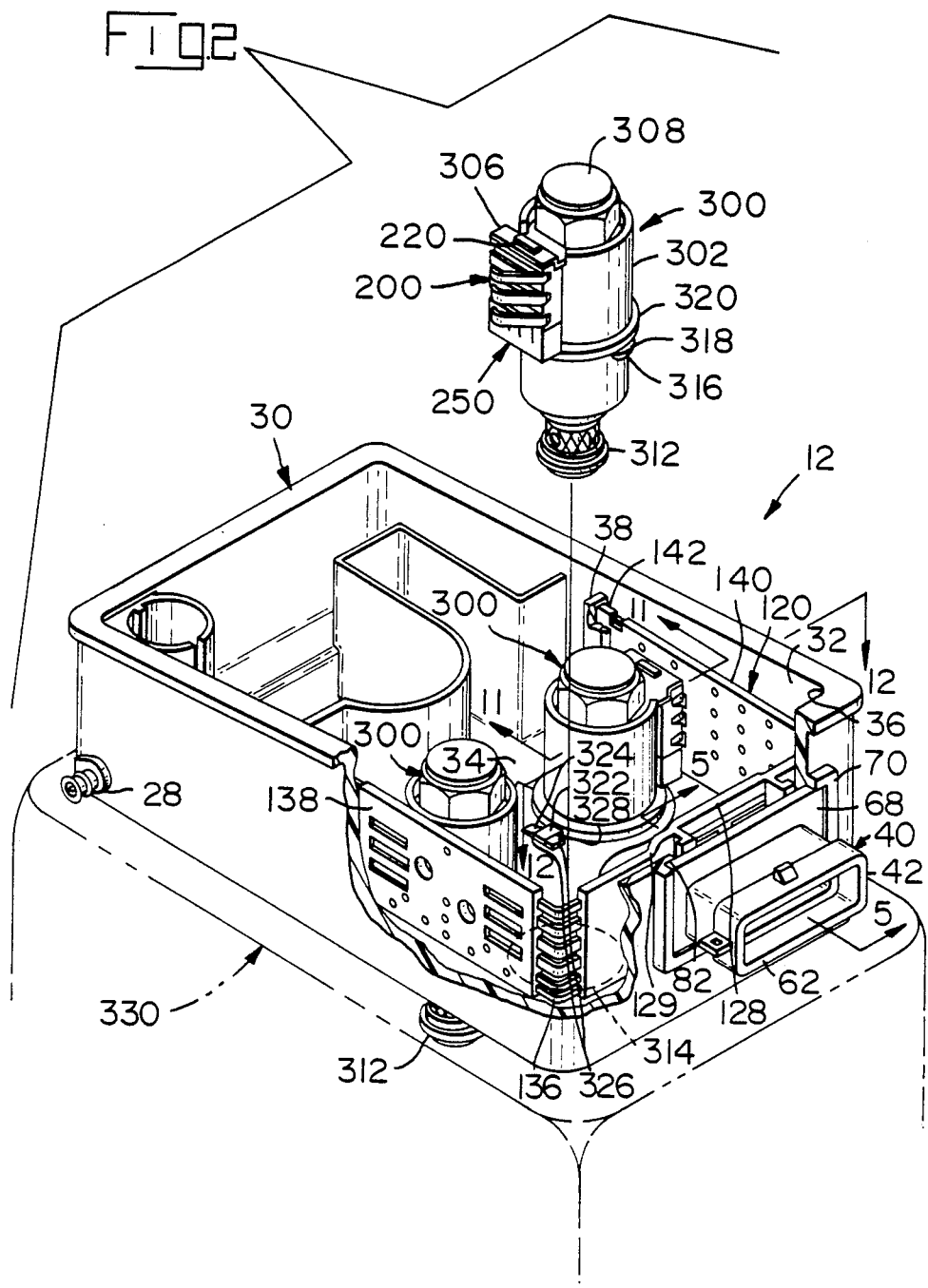

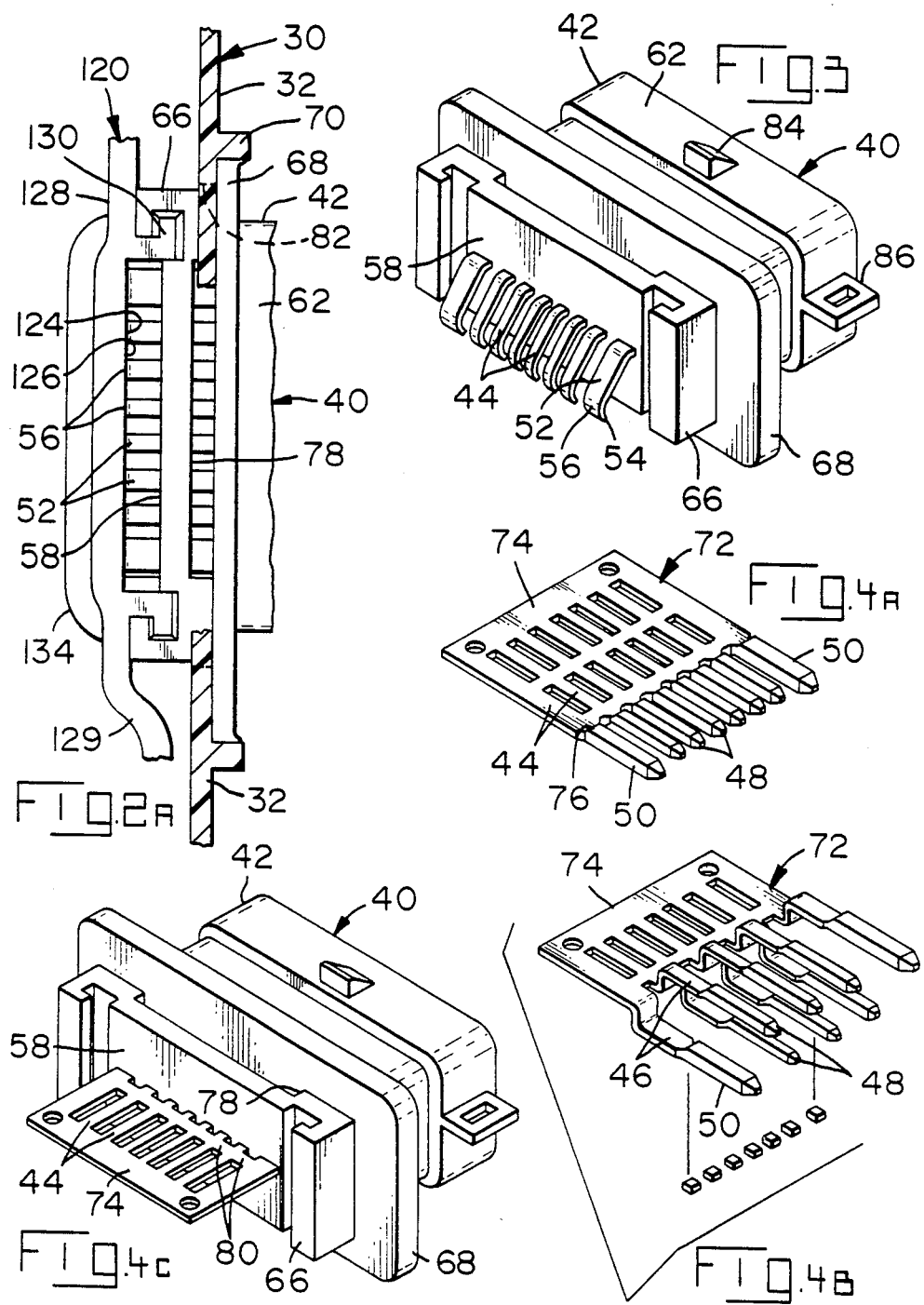

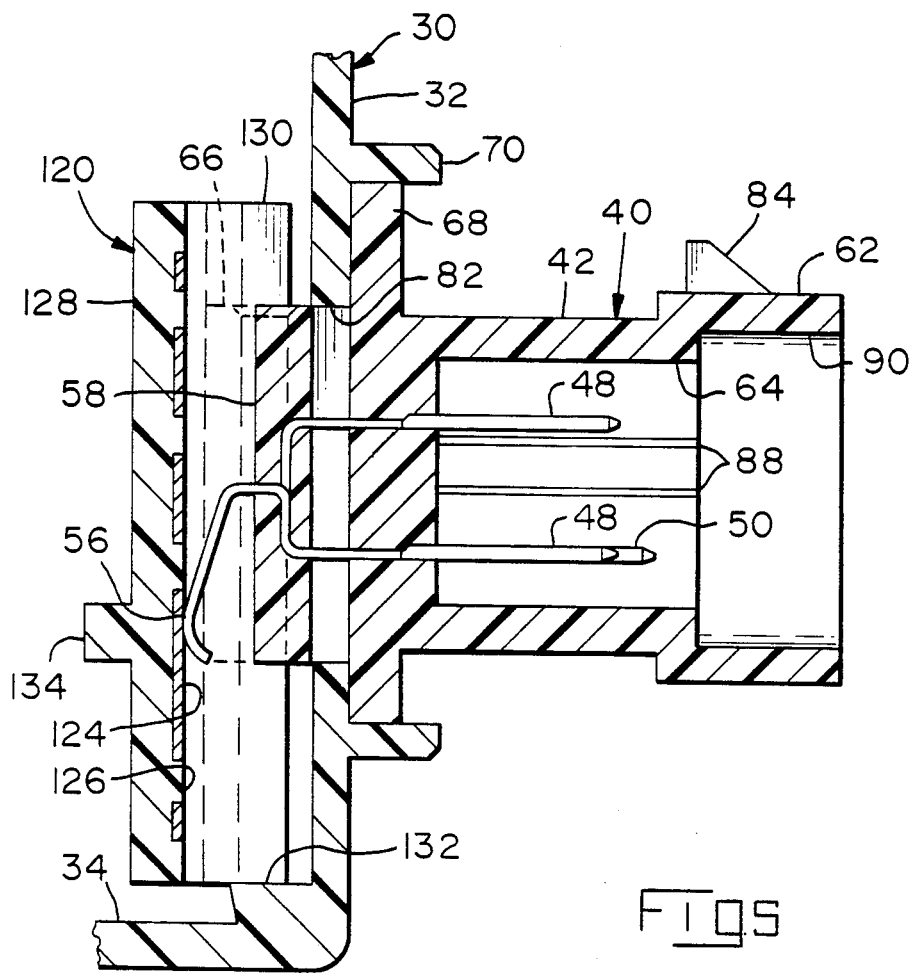

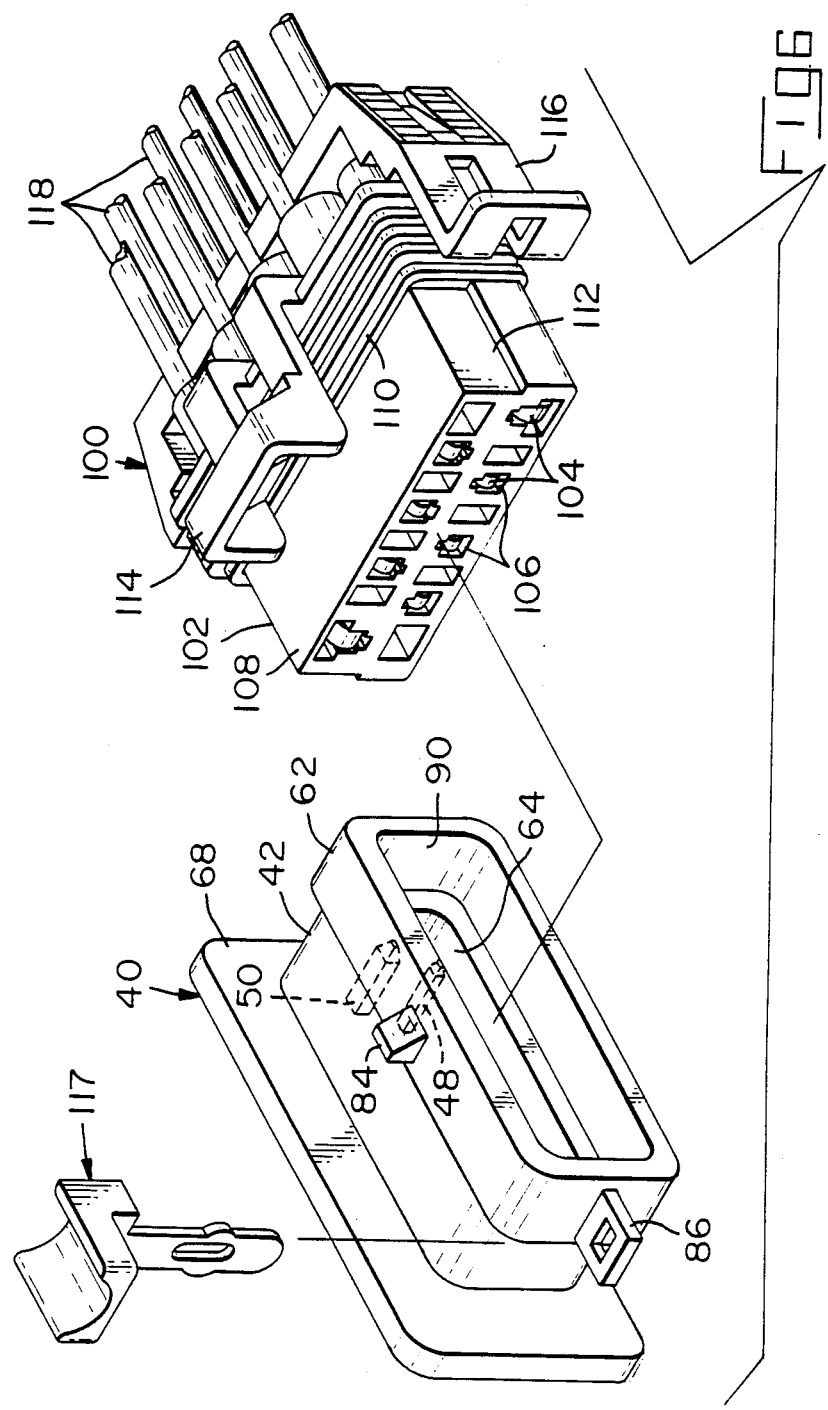

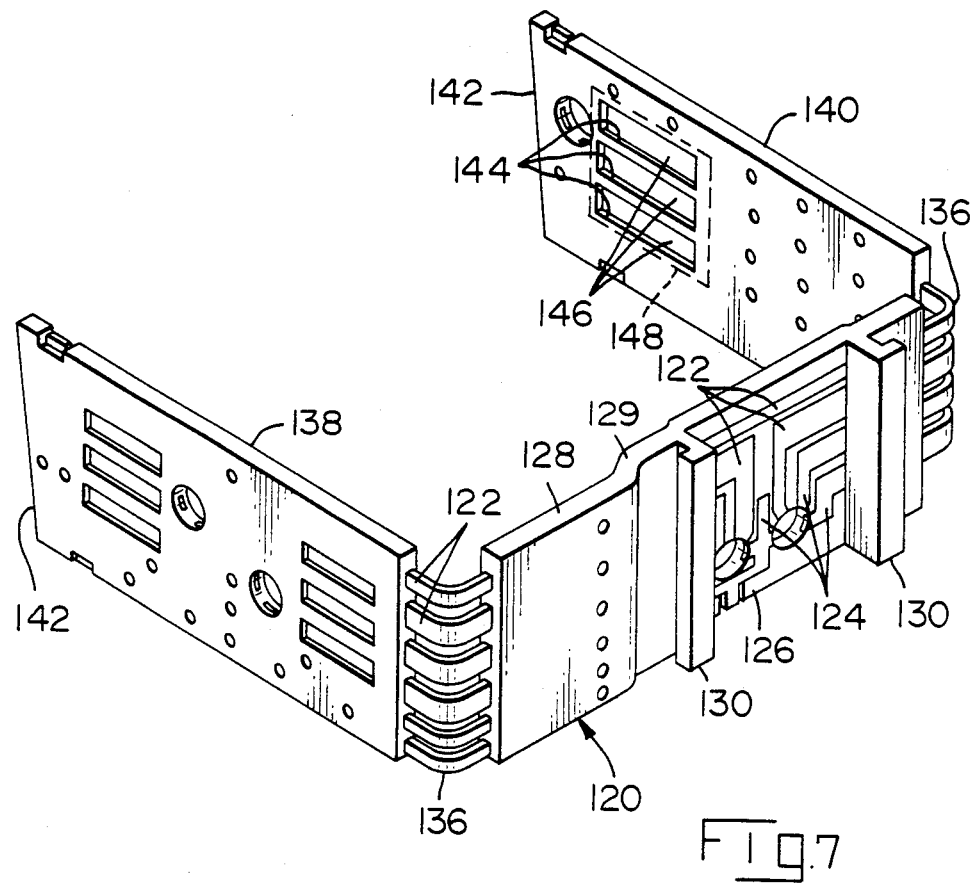

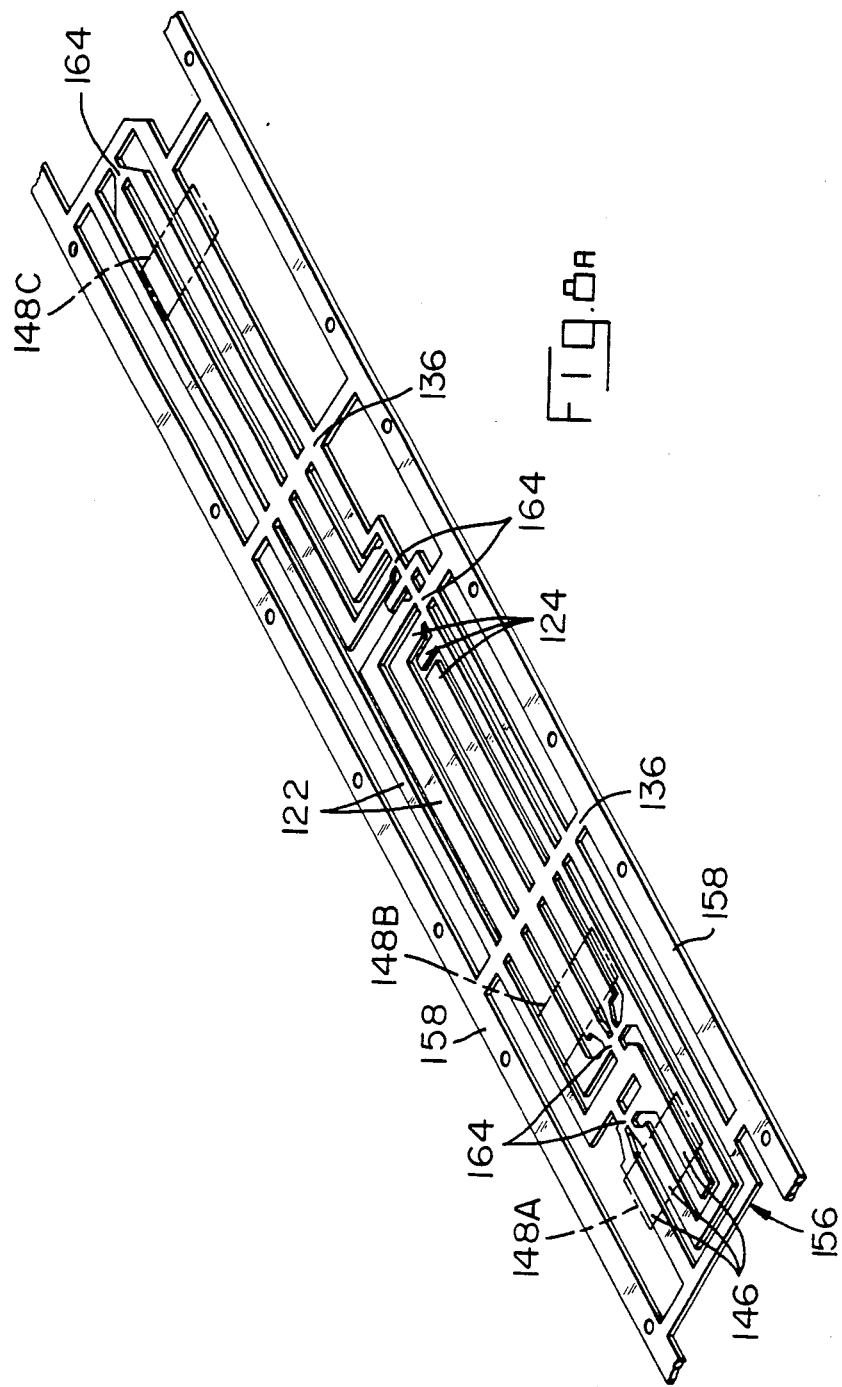

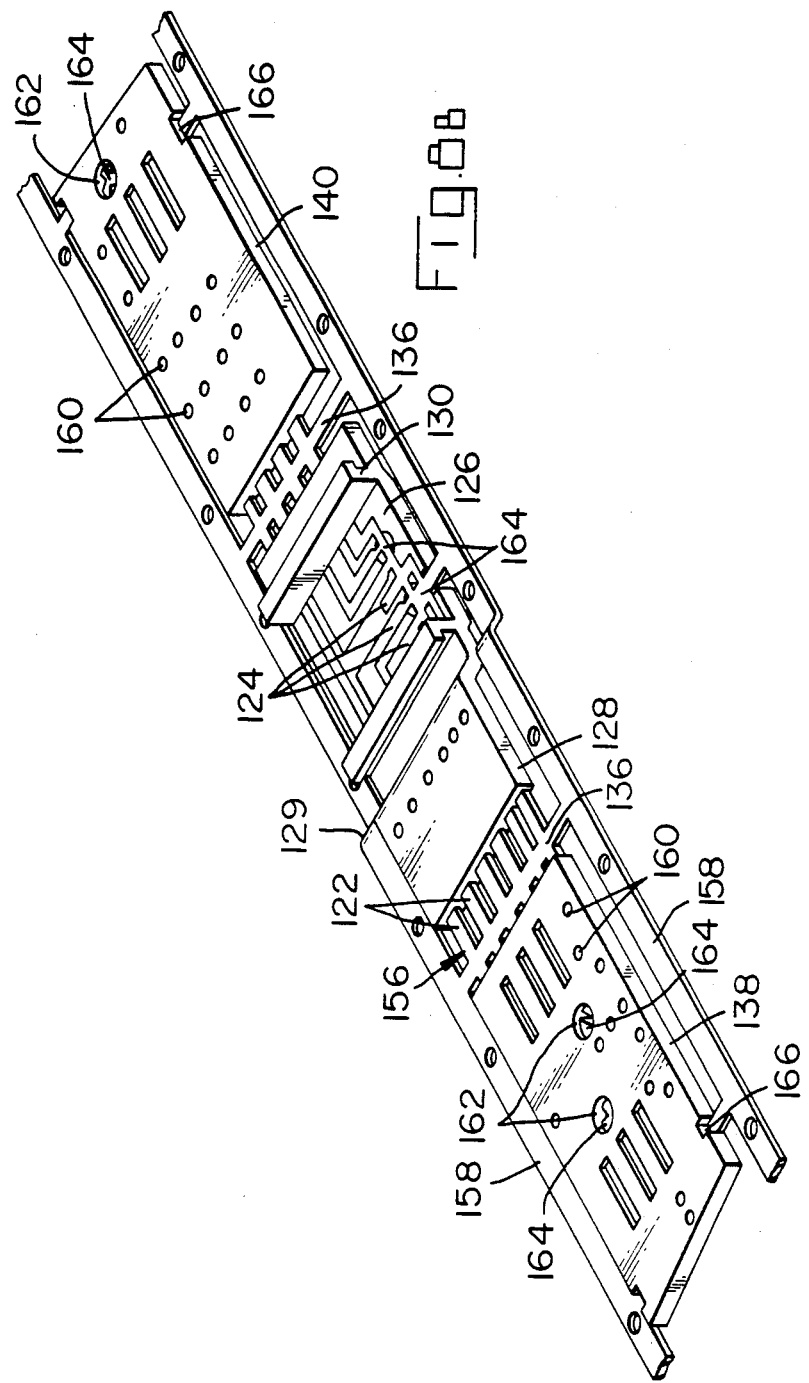

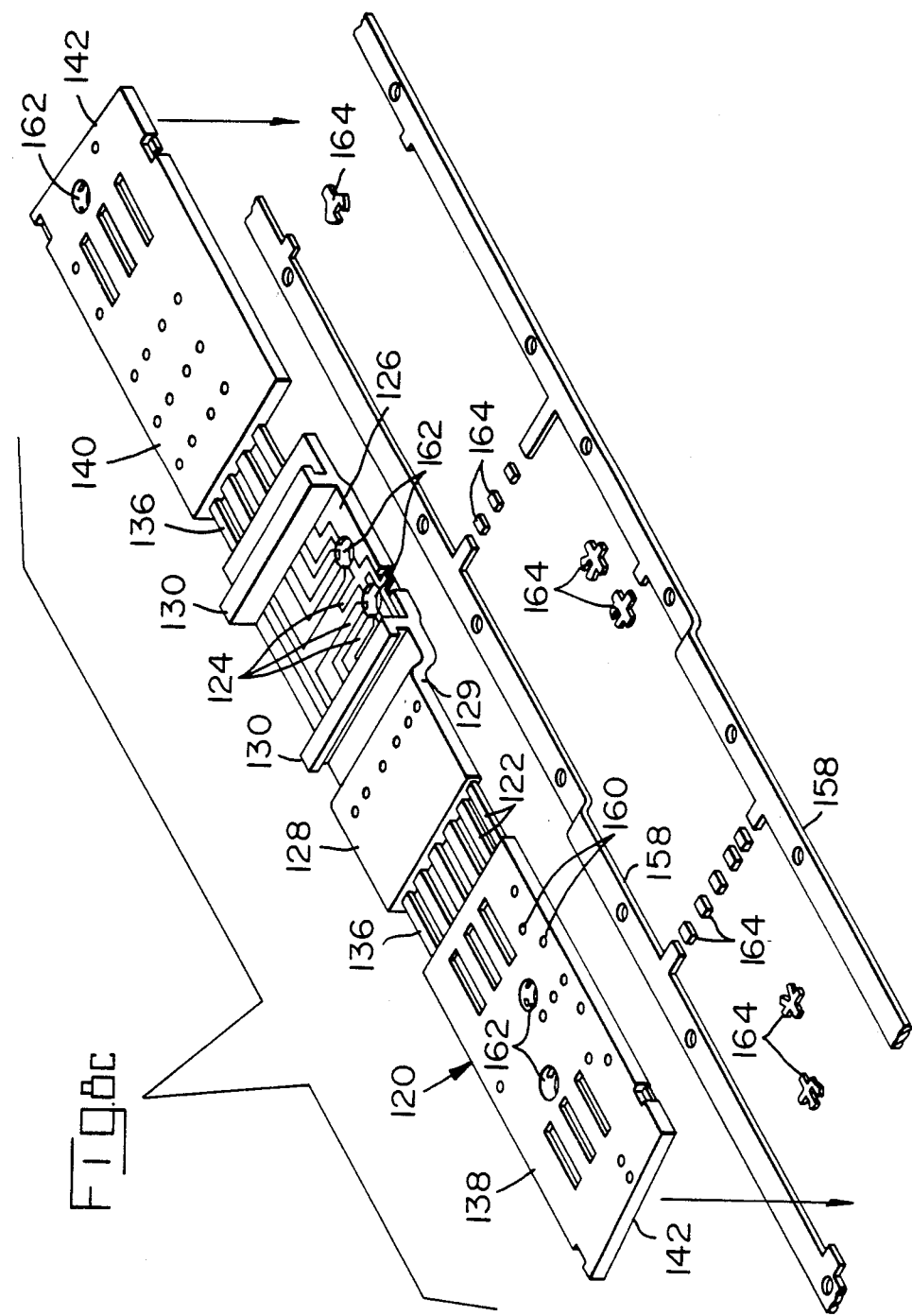

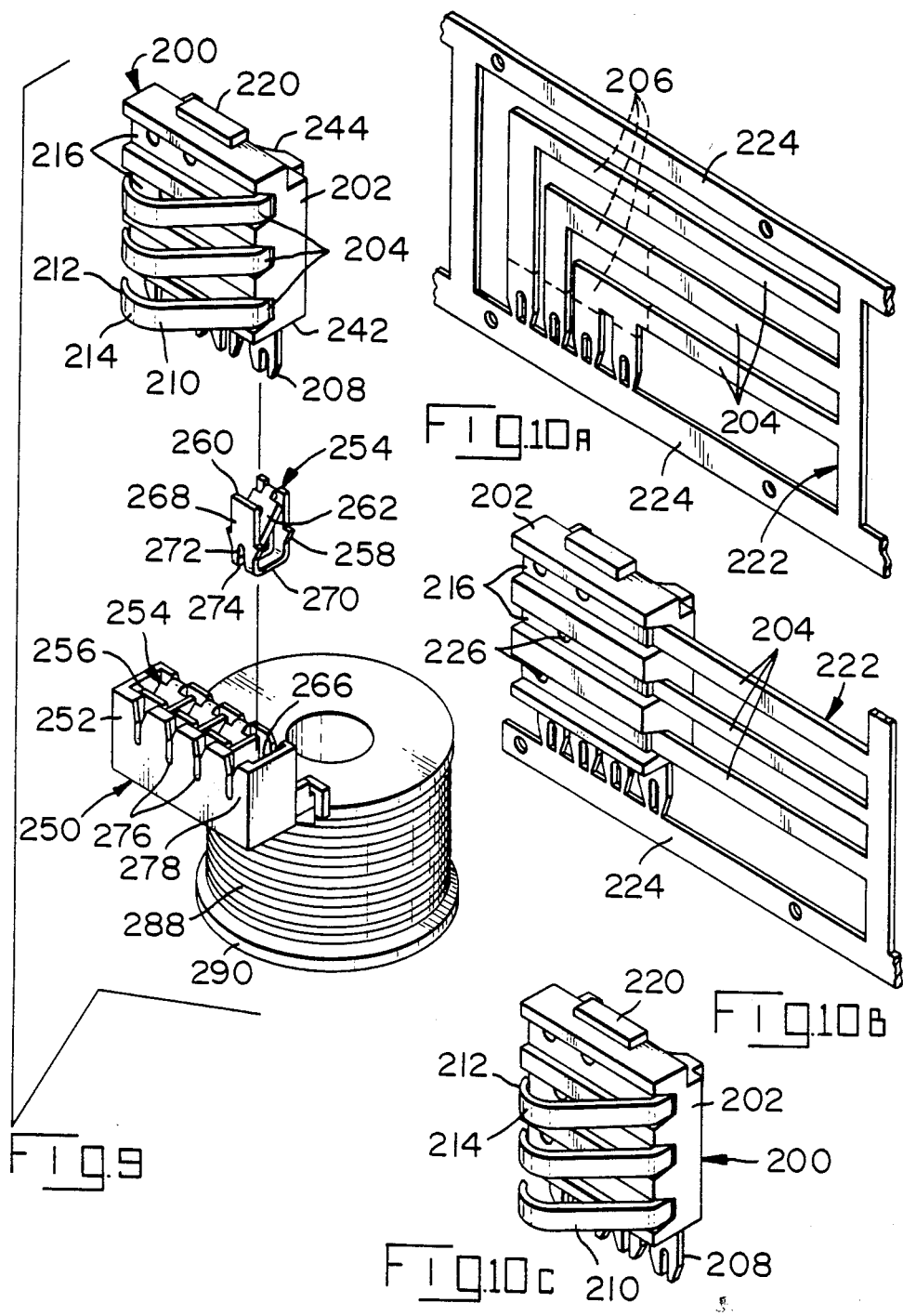

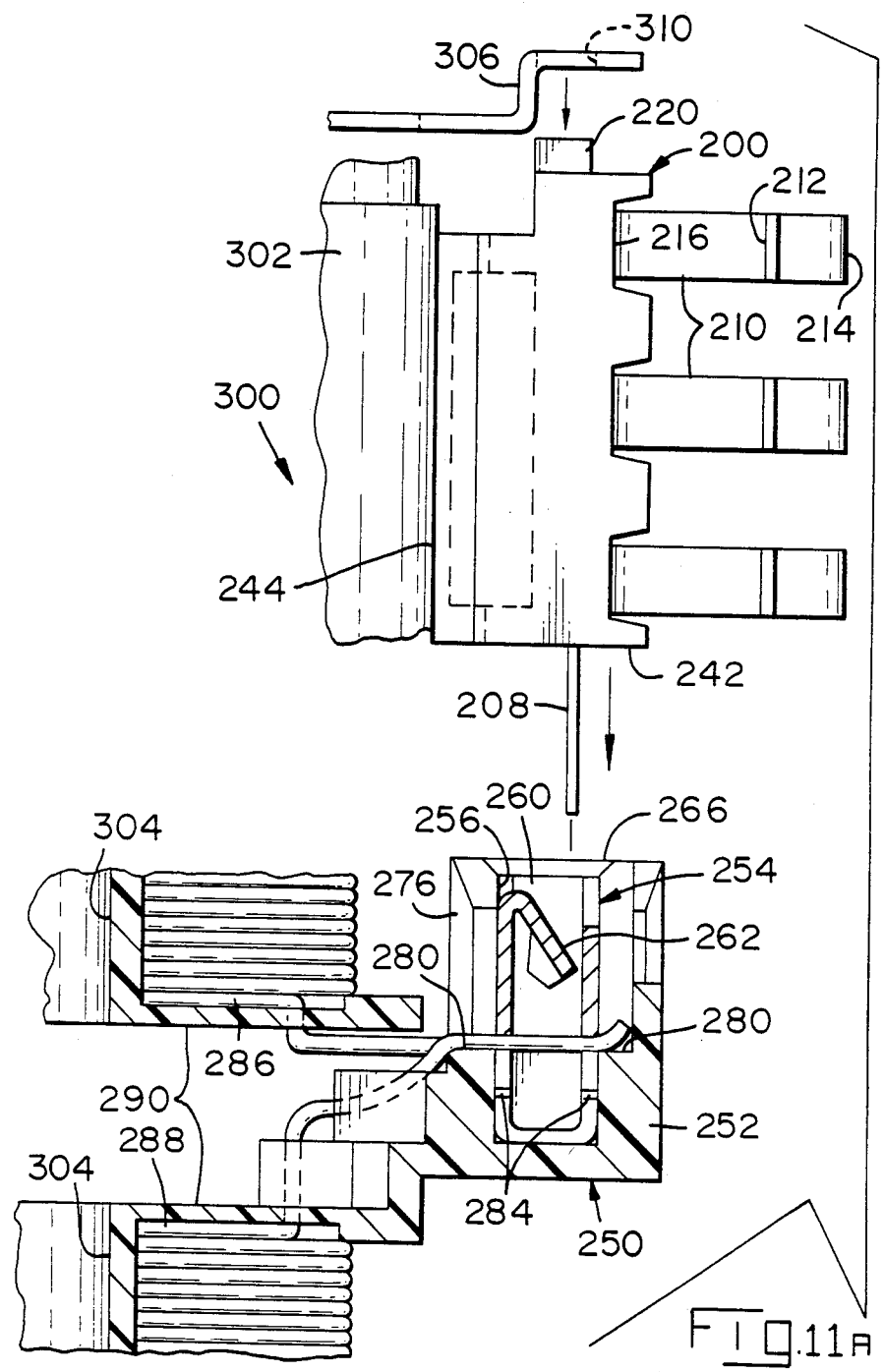

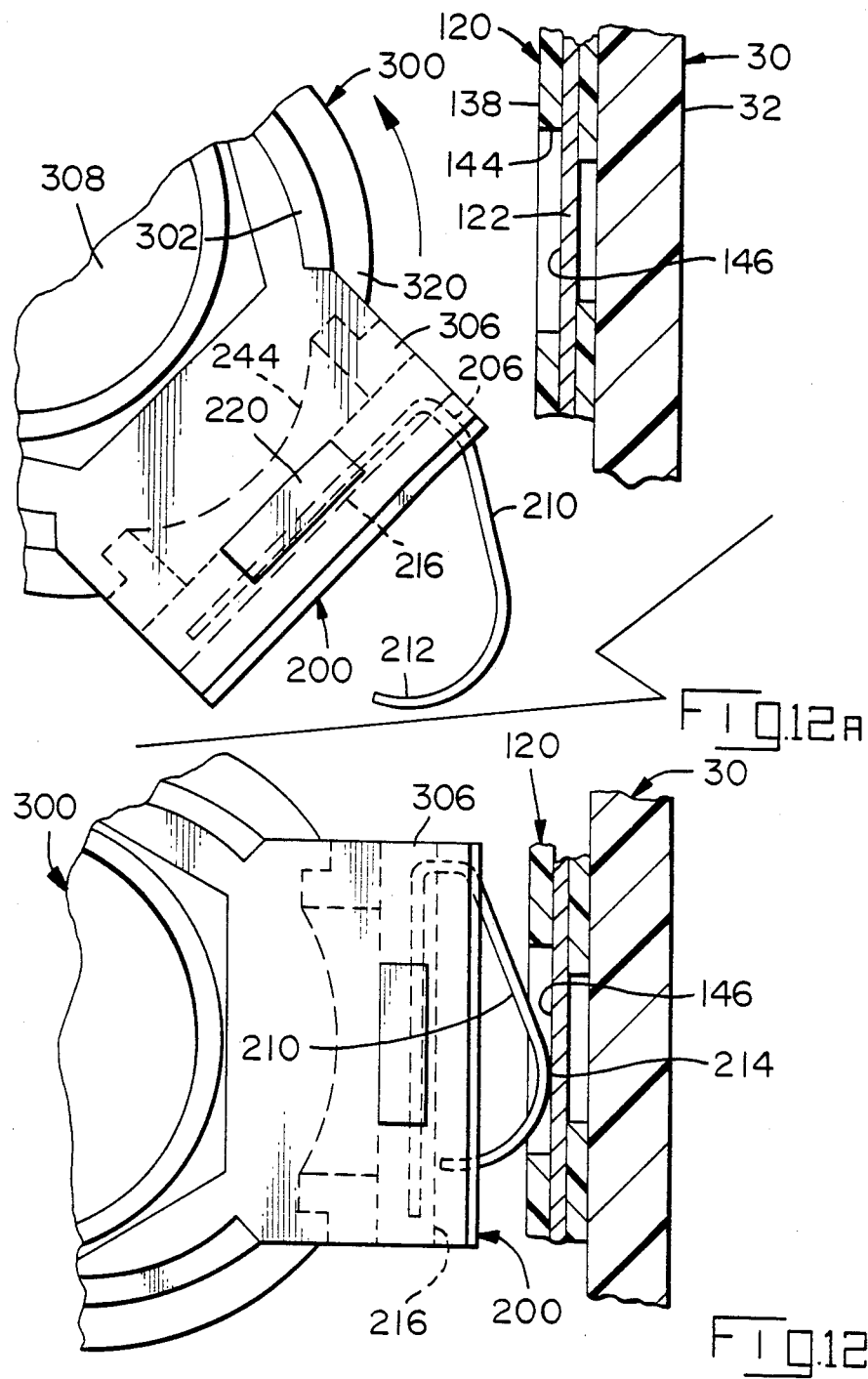

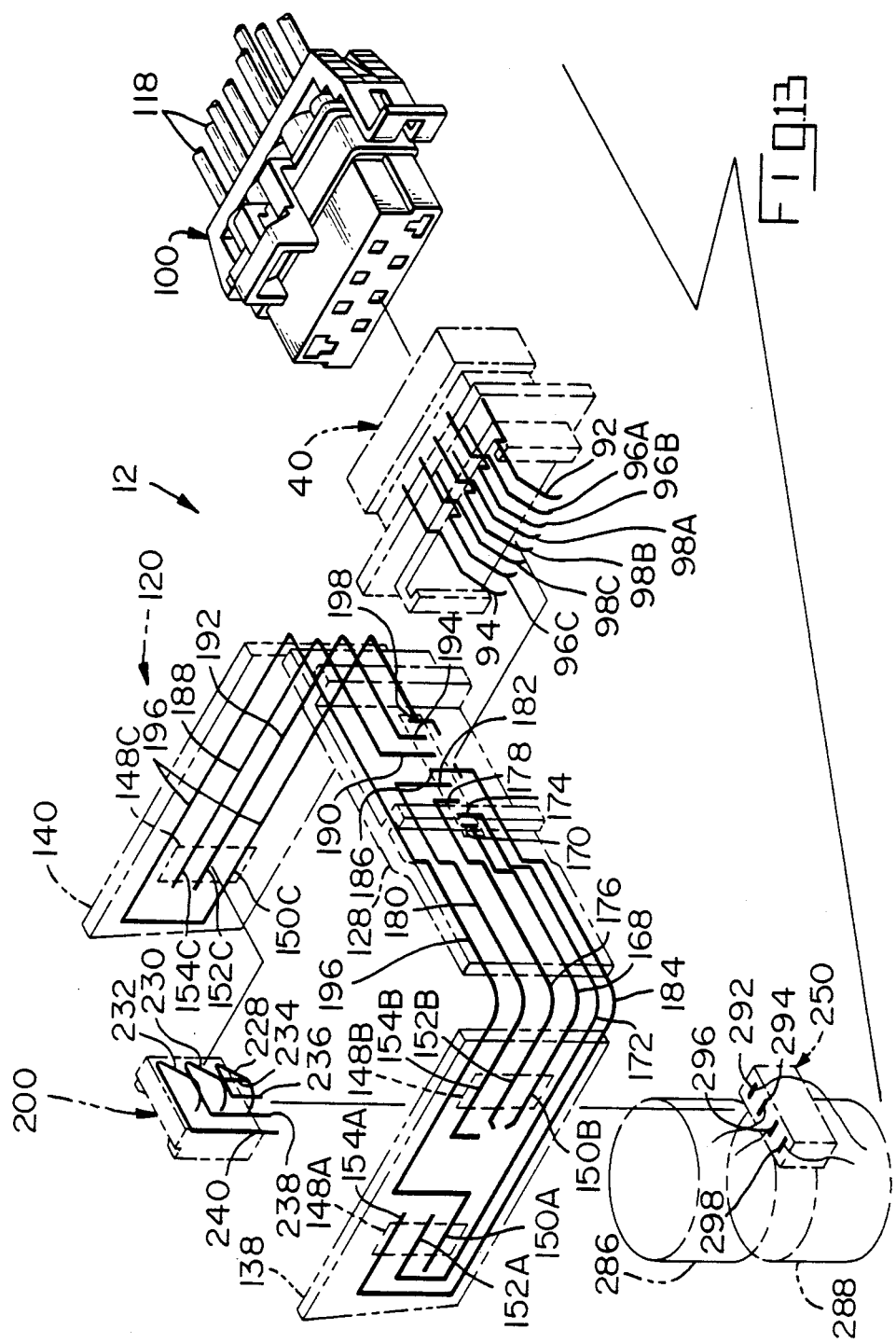

METHOD OF MAKING ELECTRICAL CONNECTOR ASSEMBLY FOR ANTISKID BRAKING SYSTEM

This is a dimensional application of application Ser. No. 06/789,999, U.S. Pat. No. 4,697,863, filed Oct. 22, 1985.

FIELD OF THE INVENTION

This relates to the field of electrical connectors and more particularly to an assembly of electrical connectors to actuate solenoid valves.

BACKGROUND OF THE INVENTION

Anti-lock braking systems are known comprising microprocessor controlled devices designed to prevent sudden braking from locking the wheels of an automobile and sending it into a skid. Such devices modulate the brake pressure applied to each wheel individually or to the front wheels individually and the rear wheels together, preferably in response to wheel-speed sensors on each wheel. Such magnetic or electronic sensors constantly monitor individual wheel speed and transmit data up to 2000 times per second to the on-board computer or microprocessor, and thus are capable of detecting rapid changes in wheel rotational speed. Early vacuum-mechanical systems were relatively bulky and costly, and they controlled only the rear wheels, working only to prevent rear-wheel skids. Such early systems did not retain maneuverability during sudden stops, meaning that desirable changes in the vehicle's direction could not be attained.

A typical modern system brakes each wheel appropriately, responding to a lockup signal by automatically pumping the brakes, repeatedly releasing and applying pressure to the brakes as many as twelve cycles per second. Some such modern systems also use hydraulic circuits to provide extra boosts of brake pressure when needed but are very costly. Modern systems also rely on two identical logic circuits which must agree before the anti-lock braking system would function; otherwise, regular drive-controlled braking will remain in effect.

Conventional systems utilize modulators (such as solenoid valves with bypass valves) located at each wheel, or at each front wheel and at the rear-axle pinion to modulate each front wheel separately and the rear wheels together. It is desirable to locate all modulators at one location greatly reducing assembly costs.

It is desirable to gang together all electrical wires from the computer in a single wire harness. It is further desirable to provide one assembly of solenoids having a single electrical connector assembly matable with the wire harness from the computer.

It is still further desirable to provide solenoids having two levels of responses to provide lesser or greater influence on the wheel braking systems.

SUMMARY OF THE INVENTION

A computer-controlled antiskid braking system for an automobile includes individual wheel rotation sensors which transmit to a computer which compares the information and determines if a wheel is about to skid during braking. The computer causes power current to be sent to an appropriate one of several solenoids which one solenoid controllably and incrementally releases pressure along the now-pressurized brake fluid line between the master cylinder and the individual brake system for the about-to-skid wheel.

The solenoids are secured in a covered reservoir or tank containing electrically nonconductive brake fluid above a cast metal housing and extend therebetween in communication with the brake fluid passageways extending to each wheel. A solenoid connector electrically connects appropriate leads of a primary and a secondary magnet wire coil which generate two levels of responses of the solenoid spindle, to conductive paths of a connector harness secured to inside surfaces of sidewalls of the tank. The conductive paths extend from all the solenoid connectors to contact sections in a single defined contact area to be engaged by terminals of a bulkhead connector. The bulkhead connector is disposed through an aperture of the tank wall and sealingly secured to the tank wall around the aperture, preferably by ultrasonic welding, and the terminals thereof extend inwardly to the connector harness inside the tank and outwardly within a receptacle portion of the bulkhead connector outside the tank. The connector's receptacle portion receives a plug portion of a mating connector of a wire harness electrically connected to a power supply controlled by the computer. The connector harness within the tank preferably is made by molding a three-part housing over the conductive paths on a lead frame, with apertures defining exposed contact sections of the conductive paths, for engaging solenoid connector contacts or contact sections flush with a housing surface for engaging contacts of the bulkhead connector. The links between the conductive paths are then severed. By molding the housing in three distinct spaced portions, the conductive paths which are spaced and parallel at that location may be bent so that the connector harness may extend around inside corners of the tank. The bulkhead connector and each solenoid connector may also comprise lead frames which are overmolded.

The contacts of both the solenoid connectors and the bulkhead connector preferably comprise spring contact arms which engage contact surfaces of the conductive paths of the connector harness, so the connector harness can be substantially completely planar in construction.

The connector harness is assembled to the tank after the bulkhead connector has been sealingly secured in the tank wall aperture with spring contact arms disposed and aligned horizontally in a contact engagement area. The connector harness is bent appropriately to conform to the shape of the inside of the tank sidewalls and is urged downwardly with parallel vertical mounting flanges engaging cooperating parallel vertical mounting flanges of the bulkhead connector, until contact sections of the conductive paths are engaged under spring bias by the spring contact arms of the bulkhead connector. The vertical movement of the connector harness is stopped at this point by stops on the floor of the tank. The end portions of the connector harness similarly are engaged by mounting flanges on the tank sidewalls and are stopped by stops on the tank floor. The connector harness may then be secured to the tank sidewalls much as by heat staking, bonding or ultrasonic welding.

Each solenoid connector is secured to the solenoid forming a solenoid assembly. Each solenoid assembly is then secured to the floor of the tank after assembly of the connector harness to the tank and the bulkhead connector, by being inserted into a hole in the tank floor and then rotated such that the spring contact arms wipe into biased engagement with the appropriate conductive paths on the connector harness, and the assembly is then latched at that angular location. One solenoid assembly can be utilized to affect the braking of both rear wheels, whereas each front wheel has a separate assigned solenoid assembly.

BRIEF DESCRIPTION OF THE DRAWINGS

FIG. 1 is a block diagram of the antiskid braking system for a vehicle to which the present invention relates.

FIG. 2 is a perspective view of the electrical connector assembly assembled to a brake fluid tank.

FIG. 2A is a part plan view of the bulkhead connector and connector harness mounted to the tank.

FIG. 3 is a perspective view of a bulkhead connector.

FIGS. 4A, 4B and 4C show the making of the bulkhead connector of FIG. 3.

FIGS. 5 and 5A are section views of the bulkhead connector of FIG. 3 assembled to the tank, and the connector harness being mounted thereonto, with FIG. 5 taken along lines 5—5 of FIG. 2.

FIG. 6 is a perspective view of the bulkhead connector and a mating connector.

FIG. 7 is a perspective view of the connector harness of the present invention.

FIGS. 8A, 8B and 8C show the making of the connector harness of FIG. 7.

FIG. 9 is an exploded perspective view of the solenoid connector, the magnet wire connector of a coil of the solenoid and a magnet wire terminal.

FIGS. 10A, 10B and 10C show the making of the solenoid connector of FIG. 9.

FIG. 11A demonstrates the mounting of the solenoid connector to the magnet wire connector, with a magnet wire terminal terminated to an end of the magnet wire of a coil.

FIG. 12 is a top view taken along line 12—12 of FIG. 2 and shows a solenoid connector engaging the connector harness of FIG. 7.

FIG. 12A is a part plan view showing the mounting of a solenoid assembly to the tank, to engage the connector harness.

FIGS. 13 shows the electrical paths of the electrical connector assembly of the present invention.

DETAILED DESCRIPTION OF THE PREFERRED EMBODIMENT

Figure 5A:
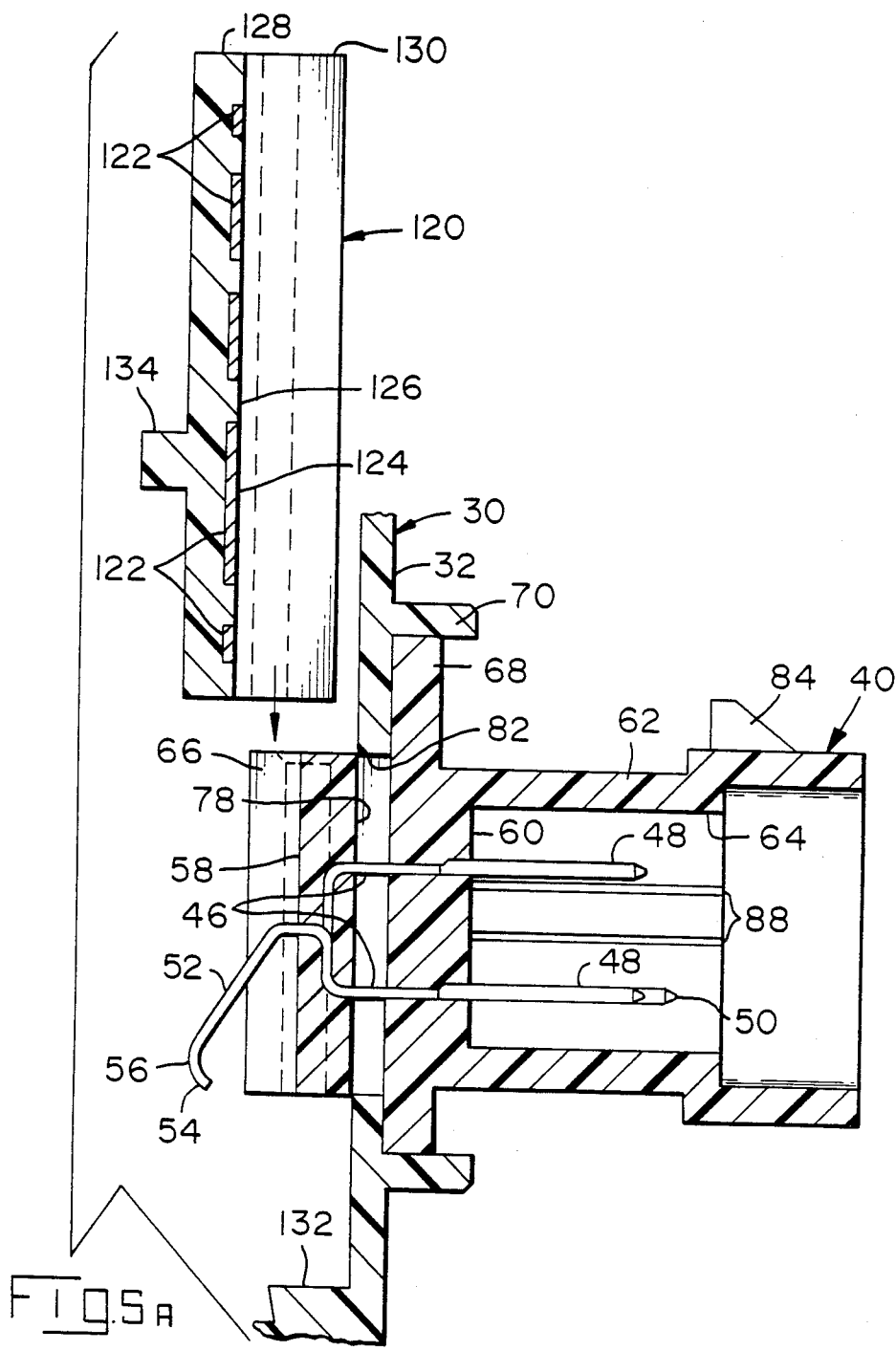

FIG. 1 is a block diagram illustrating the anti-skid braking system 10 of which the connector assembly 12 of the present invention is a part. System 10 as described herein relates to an automobile having an on-board control computer 14 and four wheels 16, as well as a brake fluid tank 30 and master cylinder 330. Each wheel 16 has a brake cylinder 18 connected by a hydraulic line 20 to master cylinder 330. A sensor 22 associated with each wheel 16 senses the rotational speed thereof during braking and signals the computer 14. Computer 14 compares the information from each wheel sensor 22 during braking and by an algorithm determines if a wheel is about to skid, by determining that a particular wheel's rotational speed is becoming substantially less than the speed of the other wheels. In such a case the computer will cause power to be sent to a particular solenoid 300 in tank 30 to actuate same which will instantaneously relieve by a selected amount, the pressure on the particular hydraulic line 20 leading to the particular wheel 16. System 10 can be designed to have the capability to take continuous readings by sensors 22 to be able to actuate a solenoid 300 by a micropulse occurring within milliseconds, and at two levels of solenoid response.

Computer 14 controls solenoids 300 by controlling switches to chassis ground to which are connected ground lines of electrical cables 118 terminated by wire harness connector 100, with power lines of cables 118 connected to power supply 24. Connector 100 mates with bulkhead connector 40 mounted on the brake fluid tank 30, and bulkhead connector 40 extends into tank 30 and is electrically connected to connector harness 120 within tank 30. In turn, connector harness 120 is electrically connected to solenoids 300 mounted within tank 30 which solenoids 300 are in communication with respective passagways in master cylinder 330 disposed immediately under tank 30. The passageways are in communication with respective hydraulic lines 20 heading to respective brake cylinders 18 of respective wheels 16. In the embodiment shown, both rear wheels LR and RR have at least a common passageway within master cylinder 330 and are affected in tandem by only one respective solenoid 300C. Each front wheel LF and RF has a separate solenoid 300A, 300B respectively. A fluid supply line 26 leads from tank 30 into master cylinder 330, and tank 30 preferably has a fluid level sensor 28 to detect an insufficient level of brake fluid within tank 30 and to signal computer 14 thereof.

FIG. 2 shows connector assembly 12 of the present invention which in the preferred embodiment comprises bulkhead connector 40, connector harness 120, and three solenoid connectors 200 and associated magnet wire connectors 250 of the three solenoid assemblies 300.

Fluid tank 30, as shown in FIG. 2, is preferably molded integrally of thermoplastic resin such as glass-filled nylon, having sidewalls 32, floor 34, corners 36 and flanges 38. One of sidewalls 32 has an aperture 82 through which will be sealingly secured bulkhead connector 40. Fluid tank 30 will be securely mounted atop master cylinder 330 during assembly. Connector harness 120 will be mounted to walls 32 within tank 30. Solenoid assemblies 300 will be secured to tank floor 34, having lower portions extending through apertures 314 into respective passageways of master cylinder 330 associated with the hydraulic lines extending to the brake cylinders of the several wheels.

Referring to FIGS. 3 and 4B, bulkhead connector 40 comprises a housing 42 and eight contact members 44. Each contact member 44 includes body section 46, post section 48,50 extending forwardly therefrom and spring contact arm section 52 extending rearwardly therefrom. Spring contact arm section 52 has an arcuate end portion 54 on the outside surface of which is a contact surface 56. The spring contact arm sections 52 of all of the contact members 44 are parallel and aligned, extending rearwardly from mating face 58 of housing 42. Housing 42 has an outer mating section comprising a hood section 62 extending forwardly of mating face 60 defining a large cavity 64 within which are disposed post sections 48,50 of contact members 44. Housing 42 also has an inner section including mounting flanges 66 for securing to connector harness 120, and a weld flange 68 for securing to tank weld section 70 of fluid tank 30 peripherally around aperture 82 preferably by ultrasonic welding as is conventionally known.

Referring to FIGS. 4A, 4B and 4C, bulkhead connector 40 is preferably made in the following manner. A lead frame 72 is stamped and formed of copper-iron alloy in continuous strip form which is then plated with tin-lead over nickel, with contact members 44 attached to a strap 74. Post sections 48,50 are preferably of greater thickness than the remainder of contact members 44, for stiffness during mating, which can best be accomplished by milling a milled section 76 into lead frame 72 prior to the forming steps. Then alternating ones of post sections 48,50 of contact members 44 are formed into two aligned rows by bending body sections 46 as indicated in FIG. 4B. Stamped and formed lead frame 72 is then placed in a mold, and housing 42 is molded therearound preferably of thermoplastic resin such as glass-filled nylon. Opposed profiled mold core sections extend into the mold cavity (not shown) in a manner generally known in conventional molding, at aperture 78 to engage portions of body sections 46 of contact members 44 to maintain them in position during molding. Contact members 44 are then severed from each other at path links 80, after which spring contact arm sections are formed as shown in FIG. 3. It is preferred to apply a sealant material around the base of each post section 48,50 where they extend forwardly from mating face 60, to compensate for shrinkage of the molded housing from therearound after molding, to maintain a fluid-tight seal through bulkhead connector 40.

Referring to FIGS. 2A, 5 and 5A, bulkhead connector 40 is preferably mounted to tank 30 by inserting it through bulkhead aperture 82 of one of tank walls 32 from the outside, so that mating face 60 and hood section 62 face outwardly and mating face 58 faces inwardly. Weld flange 68 abuts tank weld section 70 about the periphery of bulkhead aperture 82 and is sealingly secured thereat such as preferably by ultrasonic welding. Mounting flanges 66 extend inwardly from tank wall 32 to receive connector harness 120, and spring contact arm sections 52 extend inwardly from mating face 58 and downwardly. Housing 42 preferably has a latch projection 84 molded on the outside of hood section 62 to enable latching to wire harness connector 100 matable therewith. Housing 42 also preferably has an apertured lock projection 86 molded on the outside of hood section 62 to enable a secondary locking to connector 100 after latching thereto. Shown best in FIG. 5, keys 88 are molded longitudinally along the inside surface of hood section 62 to enable polarization with mating connector 100 (FIG. 6), and large cavity 64 has a larger forward cavity section 90.

Wire harness connector 100 in FIG. 6 can comprise a housing 102 and mating contacts 104. Mating contacts 104 are disposed within contact cavities 106 in plug section 108 of housing 102. Around the outside of plug section 108 is an elastomeric sealing member 110 which will be disposed within forward cavity section 90 of bulkhead connector 40 in sealing engagement with inner surfaces of hood section 62 thereof. Keying recesses 12 enter beside keys 88 (FIG. 5) for polarized mating. Latch arm 114 rides over latch projection 84 and latches therebehind upon mating of wire harness connector 100 with bulkhead connector 40. Slotted lock arm 116 extends past lock projection 86 of bulkhead connector 40, after which lock 117 is secured to lock projection 86 of bulkhead connector 40 to provide secondary locking of connector 100 to connector 40. Wire harness connector 100 is applied to the ends of electrical cables 118 which extend either to power supply 24 or to chassis ground by way of switches controlled by computer 14.

Referring now to FIG. 7, connector harness 120 has contact members 122 each of which has a contact section 124 preferably disposed flush on bulkhead-proximate contact surface 126 of insulating cover 128, which will be in electrical engagement with a corresponding contact surface 56 of a spring contact arm 52 of bulkhead connector 40 (FIG. 5). Insulating cover 128 is secured to contact members 122 and has vertical eared mounting flanges 130 which cooperate with and closely engage eared mounting flanges 66 of bulkhead connector 40 to allow mating engagement as shown in FIGS. 2A, 5 and 5A by appropriate vertical movement of connector harness 120 with respect to mounted bulkhead connector 40, and vertical movement of connector harness 120 is arrested by stops 132 on tank floor 34. Insulating cover 128 preferably has a strength rib 134 molded on the other side thereof to provide support when contact sections 124 are engaged by spring contact arm sections 52 of bulkhead connector 40 which are preferably very stiff to provide high contact force with contact sections 124.

Figure 11:
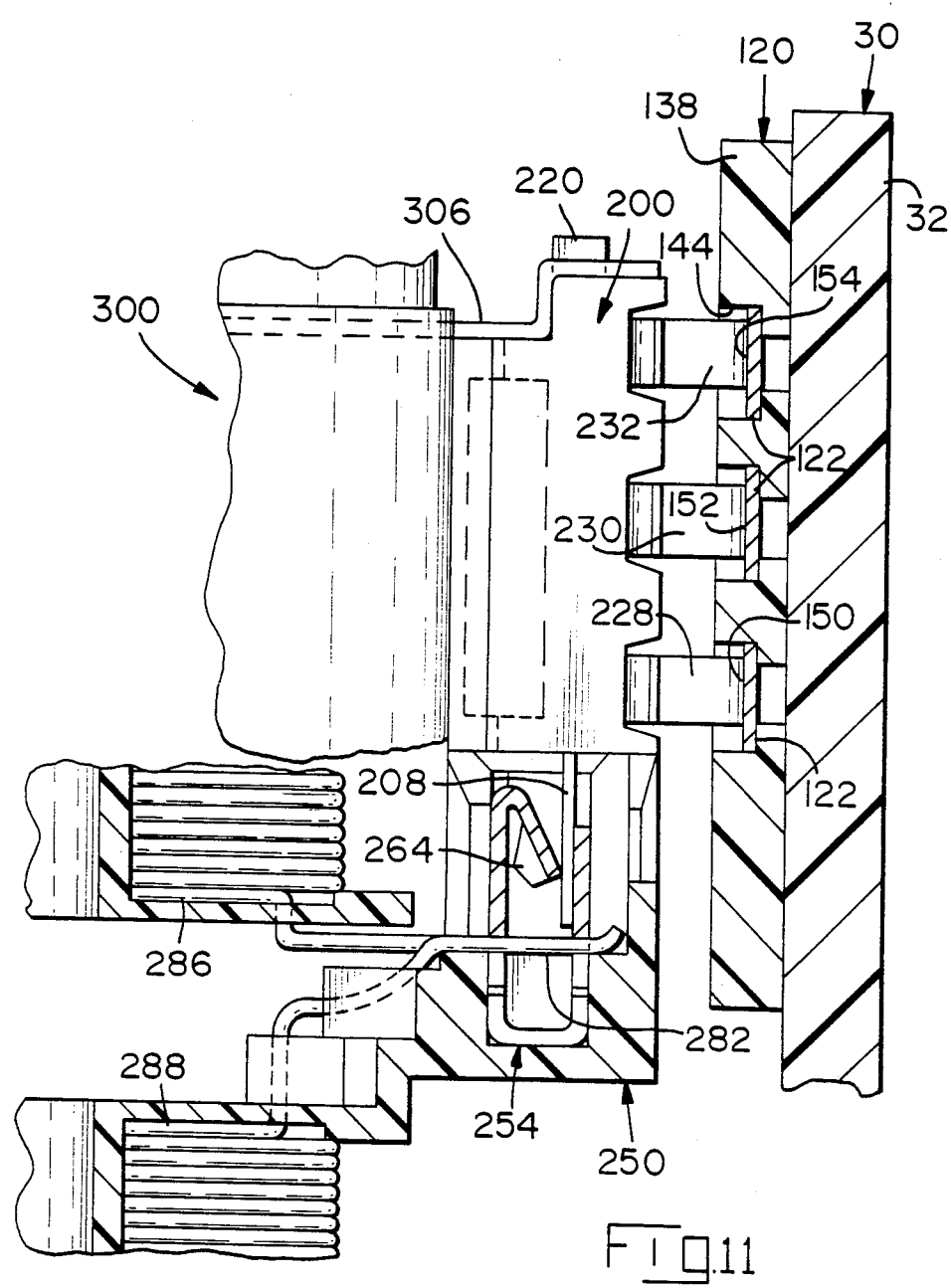
FIG. 11 is a part section view taken along line 11—11 of FIG. 2 and shows a solenoid connector mounted to a solenoid and engaging the connector harness of FIG. 7.

In FIG. 7, contact members 122 extend parallel laterally from insulating cover 128. Spaced from insulating cover 128 on either side thereof are insulating covers 138,140 around contact members 122, with contact members 122 having exposed portions between insulating covers 138,140 and insulating cover 128, defining bend areas 136. Connector harness 120 is bendable at bend areas 136 to extend around corners 36 inside tank 30, as best seen in FIG. 2. Insulating covers 138,140 have ends 142 for mounting within flanges 38 of tank walls 32 to secure connector harness 120 within tank 30. Insulating covers 138,140 have horizontally extending contact apertures 144 whereby contact sections 146 of contact members 122 are exposed for electrical engagement by mating contact members of a solenoid connector 200 (FIG. 11). Three contact apertures 144 and three contact sections 146 recessed therewithin are arranged parallel to each other in three contact areas 148, a contact area 148 for each of the three solenoid connectors 200 electrically engageable with connector harness 120 thereat. Within each contact area 148 are a power contact section, a primary ground contact section, and a secondary ground contact section. For example, as shown in FIG. 13 for contact area 148C there are power contact section 150C, primary ground contact section 152C, and secondary ground contact section 154C.

Referring to FIGS. 8A to 8C, connector harness 120 is preferably made in the following manner. A lead frame 156 is stamped from a continuous strip of copper alloy, which is then tin-lead plated, with contact members 122 connected to two parallel outer straps 158 and to each other. Bend or "jog" 129 is then formed in the lead frame. Lead frame 156 is placed in a mold having three mold cavities, and insulating covers 128,138,140 preferably of thermoplastic resin such as glass-filled nylon are molded to lead frame 156. Lead frame 156 is held in position spaced appropriately from surfaces of the mold cavity by pairs of opposing locating pins positioned at locations indicated by locating apertures 160 in covers 128,138,140. Contact sections 124 are firmly held against the mold cavity wall by locating pins extending from the opposing mold cavity wall (not shown) to assure being molded flush on surface 126. Also formed in insulating covers 128,138,140 are disconnect apertures 162, allowing access for tooling to sever contact members 122 at path links 164 therewithin, as shown in FIG. 8C. It is preferred to form lead frame 156 with as few path links 164 as possible at as few locations as possible to simplify the severing operation, and also to result in no mechanically unconnected metal portions disposed on surface 126 of cover portion 128. Formed along the sides of covers 128,138,140 are disconnect recesses 166 where contact members 122 are severed from straps 158. Contact members 122 are also severed from each other at other path links 164 severed at exposed bend areas 136.

Connector harness 120 is assembled to tank 30 in the followng manner with reference to FIGS. 2A, 5 and 5A. When bulkhead connector 40 has been secured to tank 30 through bulkhead aperture 82 and sealed, inwardly eared mounting flanges 66 thereof are spaced inwardly from tank wall 32. Connector harness 120 substantially is planar and is bent appropriately at bend areas 136 to conform to tank corners 36. Connector harness 120 is urged downwardly with outwardly eared mounting flanges 130 of insulating cover 128 cooperatingly and closely engaging inwardly eared mounting flanges 66 of bulkhead connector 40 to align harness 120. Ends 142 of insulating covers 138,140 preferably enter channels formed by eared tank flanges 38. When bulkhead-proximate contact surface 126 engages spring contact arm sections 52 at arcuate end portions 54, the spring contact arms will be deflected thereby and ride over surface 126. When the bottom edge of insulating cover 128 engages appropriately located stops 132 on the tank floor, contact sections 124 will be engaged by respective contact surfaces 56 of spring contact arm sections 52 of bulkhead connector 40 under relatively high contact force due to stiffly resilient spring contact arm sections 52. During mounting, contact sections 124 will wipe against contact surfaces 56 of spring contact arms 52 which will wipe away oxides on the contact surfaces. Cover 128 underlies and supports contact sections and includes contact sections 124 a strength rib 134 to assure maintaining contact engagement between contact sections 124 and contact surfaces 56. Bottom edges of insulating covers 138,140 also preferably meet appropriately located ones of stops 132 to accurately vertically locate contact areas 148 to be mated with contacts of solenoid connectors 200. Connector harness 120 is then preferably secured to tank 30 by heat staking, bonding or ultrasonic welding. In FIGS. 2 and 2A, bend 129 in connector harness 120 brings that portion of cover member 128 extending laterally from bulkhead connector 40, closer to sidewall 32 to provide more floor area for a solenoid assembly 300.

Referring now to FIGS. 9 to 12A, a representative solenoid connector 200 has a housing 202 and three contact members 204. Each contact member 204 has a body section 206 (shown in phantom) and at least one representative contact section 208 to engage a terminal 254 of a magnet wire connector 250 for a solenoid assembly 300. At the other end of contact member 204 is a spring contact arm section 210 having an arcuate end portion 212 with a contact surface 214. Spring contact arm section 210 is disposed parallel to a contact recess 216 of housing 202. Spring contact arm sections 210 are parallel and aligned, and contact surfaces 214 thereof engage respective contact sections of a respective one of contact areas 148 of connector harness 120 when fully assembled. The contact sections at contact areas 148 are supported by underlying portions of covers 138,140, as seen in FIG. 11. At one end of housing 202 is a seating land 220 for being secured to the solenoid assembly 300. The profile of surface 244 opposed from spring contact arms 210 is arcuate to conform to the outer cylindrical surface of the solenoid assembly's outer shield.

Solenoid connector 200 is preferably made in the following manner as shown in FIGS. 10A, 10B and 10C. A lead frame 222 is stamped from a continuous strip of brass which is then plated with tin-lead over nickel, with contact members 204 connected to two parallel outer straps 224. Lead frame 222 is placed in a mold, and housing 202 is molded thereover of thermoplastic resin such as preferably glass-filled nylon. Lead frame 222 is held in place by pairs of opposing locating pins in the mold cavity indicated by locating apertures 226. Finally, contact members 204 are severed from each other and from carrier strips 224 and spring center arms 210 are formed, extending in parallel along recesses 216 which recesses allow for tooling (not shown) for forming the spring contact arms.

In FIG. 9, 11 and 11A, magnet wire connector 250 includes a dielectric housing 252 and a plurality of representative magnet wire terminals 254 disposed in terminal-receiving cavities 256 of housing 252. Terminals 254 preferably have locking lances 258 extending from sides thereof which will penetrate adjacent surfaces along sidewalls of cavities 256 upon insertion of terminals 254 thereinto, to prevent withdrawal or removal of the terminals from cavities 256. Each terminal 254 preferably has a contact-receiving aperture 260 to receive a corresponding one of contact sections 208 thereinto. A contact-engaging spring arm 262 extends at an angle from a wall of terminal 254 to engage the contact section 208 under spring bias when inserted thereinto to assure electrical engagement therewith, and an end 264 of spring arm 262 acts to resist removal of the contact section after insertion. Cavities 256 extend downwardly into housing 252 from a top surface 266 against which mating surface 242 of solenoid connector housing 202 will be disposed upon mating, with contact sections 208 extending into and secured within respective terminals 254.

Each terminal 254 has two opposing plate-like sections 268 connected by straps 270, each plate-like section 268 having a wire-receiving slot 272 having a lead-in 274. Each terminal-receiving cavity 256 has a pair of opposing wire-receiving slots 276 extending deeply into opposing sidewalls 278, terminating at wire-supporting surfaces 280. A representative magnet wire end 282 is disposed through both slots 276 across a cavity 256 and brought to rest on wire-supporting surfaces 280, whereafter surplus wire extending beyond housing 252 is severed. A terminal 254 is then inserted into cavity 256 with its wire-receiving slots 272 aligned with wire-receiving slots 276 of the cavity sidewalls 278. To be terminated, wire end 282 relatively enters lead-ins 274 and is tightly received into slots 272 having serrations 284 by which action the varnish coating of the magnet wire is penetrated by serrations 284, and an assured electrical connection is established between terminal 254 and magnet wire end 282 at two spaced locations. By means of locking lances 258, terminal 254 is securely retained in cavity 256 and in turn secures wire end 282 therein. The magnet wire is arranged in two separate coils 286,288 tightly wound around bobbins 290 within the solenoid assembly. Each coil 286,288 has two wire ends for power input and output which are each terminated to an associated terminal of magnet wire connector 250.

Magnet wire terminals 254 preferably are stamped and formed of tin-plated brass and are similar to those disclosed in U.S. Pat. No. 4,490,004. The winding of coils 286,288 around bobbins 290 can be similar to that taught in U.S. Pat. No. 4,166,265. Housing 252 can be thermoplastic resin such as glass-filled nylon. An apparatus and method for applying terminals to magnet wires in housing cavities is disclosed in *AMP MAG-MATE Interconnect System Handbook*, No. HB5483, of AMP Incorporated, Harrisburg, PA. (9/80).

As represented in FIGS. 2 and 11A, each solenoid assembly 300 includes magnet wire connector 250 and solenoid connector 200 and generally comprises an outer metal shield 302 enclosing primary coil 286 and secondary coil 288 on respective bobbins 290 having aligned central openings defining a spindle shaft 304. A conventional spindle (not shown) will extend through shaft 304 coaxially within coil 286 and coil 288 actuatable thereby, with the spindle being spring biased downward by a conventional spring means to close a valve at the bottom of solenoid assembly 300 at an intake aperture. When primary coil 286 or both primary coil 286 and secondary coil 288 are powered in a momentary cycle, the spindle is activated upward within shaft 304 to open the valve momentarily. Such momentary opening of the valve allows a controlled, momentary release of pressure on the brake fluid line and a small droplet of fluid enters the valve under pressure and enters a fluid channel which directs the fluid droplet upward into tank 30 where it is caught and retained. At the top thereof connector clip 306 is secured thereon below cap 308 and in turn secures solenoid connector 200 to solenoid assembly 300 by means of seating land 220 captured in slot 310 of clip 306. Arcuate engagement surface 244 (FIG. 9) of solenoid connector 200 is held against the cylindrical outer surface of outer shield 302 while contact sections 208 are secured in respective terminals 254, and mating surface 242 is disposed along top surface 266 of magnet wire connector 250.

As shown in FIGS. 2, 12 and 12A, each solenoid assembly 300 is mountable in brake fluid tank 30 by first inserting a lower portion 312 through a respective aperture 314. Lower portion 312 will extend into an associated aperture (not shown) of master cylinder 330, keys 316 below mounting flange 320 pass through respective keyways of the associated aperture which angularly orients solenoid assembly 300, and mounting flange 320 of assembly 300 will engage tank floor 34. The intake aperture and valve will then be in communication with the appropriate passageway along the brake fluid line 20 leading to the brake cylinder 18 of the appropriate wheel 16 (FIG. 1). Solenoid assembly 300 is secured to tank floor 34 by being rotated through an angle of approximately 45°, and latching projection 322 extending outwardly from mounting flange 320 will ride over inclined surface 324 of cooperating latch 326 around aperture 314 and enter a latching slot between latch 326 and stop 328. Keys 316 have top horizontal bearing surfaces 318 proximate and spaced from the bottom of mounting flange 320, which engage cooperating bearing surfaces around and below a mounting flange of the associated aperture of the master cylinder, when solenoid assembly 300 is rotated. It is preferred that a gasket be disposed between tank 30 and the master cylinder, and elastomeric seals be disposed around each aperture between tank 30 and the master cylinder.

With reference to FIGS. 12 and 12A solenoid assembly 300 when first inserted into aperture 314 is vertical but is angularly disposed such that contact surface portions 214 on spring contact arms 210 of solenoid connector 200, are spaced laterally and angularly from associated contact sections 146 of the appropriate contact area 148 of connector harness 120. As solenoid assembly 300 is rotated, contact surfaces 214 engage and wipe across contact sections 146 which will remove oxides on the contact surfaces. When solenoid assembly 300 is seated, spring contact arms 210 will be spring biased against contact sections 146 establishing assured electrical engagement therewith. At maximum deflection of spring contact arms 210, the ends of arcuate end portions 212 will be able to enter channels 216, if necessary, for clearance.

A primary aperture in tank floor 34 communicates with fluid supply line 26 leading to master cylinder 330 to enable brake fluid to enter thereinto from tank 30. It is preferred that tank 30 also have a fluid level sensor means 28 such as a float to actuate a reed switch to indicate when the level of brake fluid within tank 30 drops too low.

In the preferred electrical arrangement for system 10 of FIG. 1, there are eight conductors 118 extending to wire harness connector 100. Two of conductors 118 are power leads which extend from power supply 24, such as the automobile battery, via fuses. The remaining six of conductors 118 are ground leads extending to chassis ground via switches which are selectively controlled by computer 14. It is preferred that the switches be so controlled that the computer can actuate the primary coil of a solenoid individually with one switch grounding one of the ground leads, and both the primary and secondary coils of the solenoid simultaneously with another switch, completing the grounding of both of the ground leads connected to that solenoid. Each power lead should be capable of carrying a current equal to the combined maximum currents to two solenoids, and each ground lead should be capable of carrying a design maximum current equal to the design maximum current of one coil of a solenoid, all at a maximum voltage of 14.3 volts DC.

With reference to FIG. 13 completed connector harness 120, with insulative covers 128,138,140 shown in phantom, preferably has eight contact members 122 comprising individual conductive paths. Path 168 extends between power contact section 170 in bulkhead-proximate contact surface 126, and power contact section 150B in contact area 148B. Path 172 extends between primary ground contact section 174 and primary ground contact section 152A of contact area 148A. Path 176 extends between primary ground contact section 178 and primary ground contact section 152B of contact area 148B. Path 180 extends between secondary ground contact section 182 and secondary ground contact section 154B of contact area 148B. Path 184 extends between secondary ground contact section 186 and secondary ground contact section 154A of contact area 148A. Path 188 extends between secondary ground contact section 190 and secondary ground contact section 154C of contact area 148C. Path 192 extends between primary ground contact section 194 and primary ground contact section 152C of contact area 148C. And, path 196 extends from power contact section 198 to power contact section 150C of contact area 148C and farther, to power contact section 150A of contact area 148A.

Bulkhead connector 40 with housing 42 shown in phantom, has two power contact members 92,94 having enlarged longer post sections 50, with spring arm section 52 of power contact member 92 engaging power contact section 170 of path 168 of connector harness 120, and that of power contact member 94 engaging power contact section 198 of path 196 of connector harness 120. Three contact members 44 of bulkhead connector 40 are primary ground contacts 96A, 96B, 96C engaging primary ground contact sections 174,178,194 of paths 172,176,192 of connector harness 120 respectively. The three remaining contact members 44 are secondary ground contacts 98A,98B,98C engaging secondary ground contact sections 182,186,190 of paths 180,184,188 of connector harness 120 respectively.

Regarding magnet wire connector 250, one of the wire ends of each of coils 286,288 comprises an output end terminated to respective magnet wire power terminals 292,294. Coil 286 comprises a primary coil and its input wire end will be electrically connected to primary ground contact section 230 of solenoid connector 200; and its respective terminal is thus a prmary ground terminal 296. Coil 288 comprises a secondary coil and its input wire end is connected to secondary ground contact section 232 of solenoid connector 200; and its respective terminal is secondary ground terminal 298.

FIGS. 11 and 13 also show the contact members of solenoid connector 200 with housing 202 (in phantom in FIG. 13), and also associated contact sections of connector harness 120. Power contact 228 will engage power contact section 150 of connector harness 120 and has two contact sections 234,236 in engagement with respective ones of power terminals 292,294 of magnet wire connector 250. In engagement with primary ground contact section 152 of connector harness 120 will be primary ground contact 230, having a contact section 238 engaging primary ground terminal 296. In engagement with secondary ground contact section 154 of connector harness 120 will be secondary ground contact 232 having a contact section 240 engaging secondary ground terminal 298. Power contact sections 234,236, primary ground contact section 238 and secondary ground contact section 240 extend outwardly below mating surface 242 of housing 202, substantially aligned with each other for simultaneous insertion into their respective magnet wire terminals of magnet wire connector 250.

Specifically with regard to the current capabilities of the various electrical paths, it is preferred that each coil of a solenoid draw a nominal actuating current of 5 amps and a design maximum of 7.3 amps, which thus become the design parameters for each ground path including the ground leads of the wire harness. The power path of connector harness 120 (path member 168), for solenoid 300B should have design parameters for both coils 286,288 of solenoid 300B totalling 10 amps nominal, 14.6 amps maximum. The power path for solenoids 300A, 300C, path member 196, should have design parameters for four coils, totalling 20 amps nominal, 29.2 amps maximum. Each power lead of wire harness conductors 118 should also be capable of carrying 29.2 amps maximum.

Figure 14:
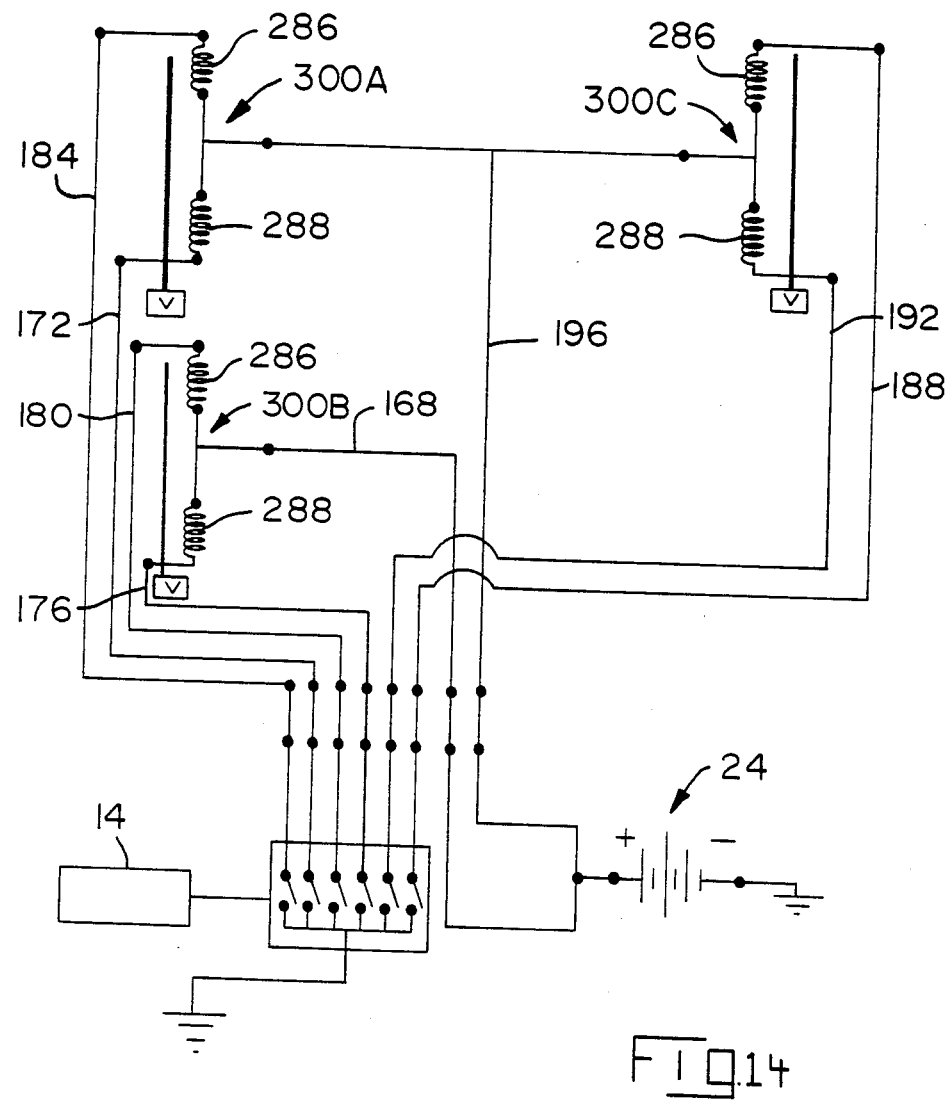
FIG. 14 is a circuit diagram of the electrical connector assembly of the present invention.

FIG. 14 shows the preferred electrical circuit diagram for the connector assembly of the present invention including all of the solenoids and their primary and secondary coils.

It can be seen that the connector assembly of the present invention is easily capablle of utility in conjunction with a hydraulic system other than the brake system of an automobile, where solenoids are sure to be physically proximate each other in a fluid containing container. More than three solenoids can be used with appropriate modifications to the connector assembly as desired. Solenoids with one coil or with more than two coils can be accommodated with appropriate modifications to the present invention. It can also be seen that the connector harness of the present invention can be utilized in a container other than a fluid reservoir, and can electrically connect electrical articles other than solenoids.

The solenoid connector of the present invention may also be used to connect a solenoid having more than one coil, to another electrical article having contact surfaces. Other changes and modifications may occur which are within the spirit of the invention and the scope of the claims.

What is claimed is:

1. A method for making a connector harness mountable on wall means of a container having at least one corner, said connector harness having a plurality of path members each including a first contact section, a second contact section and a body section therebetween, said first contact sections of said path members to be disposed on a first portion of said container wall means and said second contact sections to be disposed on a second portion of said container wall means with said at least one corner being situated between said first and second wall portions, comprising the steps of:
    stamping a lead frame from a strip of metal, said lead frame including said path members joined to each other at path links and said lead frame being joined to carrier strips;
    placing said lead frame into a mold having at least two mold cavities spaced apart, with a first portion of said lead frame having said first contact sections disposed in one said mold cavity, a second portion of said lead frame having said second contact sections disposed in another said mold cavity, and at least a third portion of said lead frame extending between each adjacent pair of said at least two spaced apart mold cavities, and said carrier strips being outside said at least two mold cavities;
    molding insulative cover portions over at least said first and second lead frame portions such that said first and second contact sections are exposed, and such that apertures are formed in said cover portions exposing ones of said path links disposed in said at least two mold cavities and said at least a third portion of said lead frame extends between said cover portions;
    severing all path links desired to be severed from said lead frame whereby said path members are separated from one another; and
    severing said lead frame from said carrier strips, whereby said lead frame is bendable between said cover portions and said first and second contact sections are electrically engageable by mating electrical contact members.

2. A method as set forth in claim 1 wherein said path link apertures extend inwardly to said path links from opposing surfaces of said cover portions to provide access for severing tooling and facilitate removal of severed path links.

3. A method as set forth in claim 1 wherein contact-receiving apertures are formed in said cover portions during said molding step extending inwardly to respective ones of said contact sections.

4. A method as set forth in claim 1 wherein said steps of severing of path links and severing from said carrier strips are performed simultaneously.

5. A method as set forth in claim 1 wherein said lead frame is plated after said stamping step

* * * * *